Oct. 31, 1967  R. G. RAUTH  3,349,822
FRESH CORN TRIMMING AND GRADING MACHINE
Filed Nov. 10, 1965  2 Sheets-Sheet 1
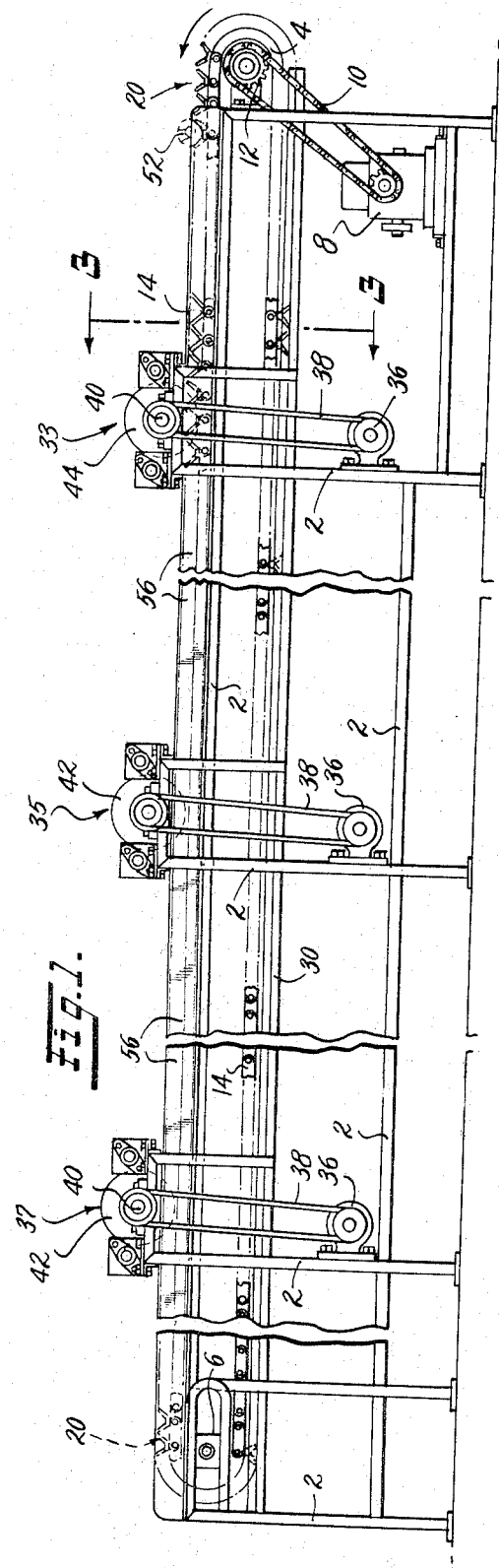
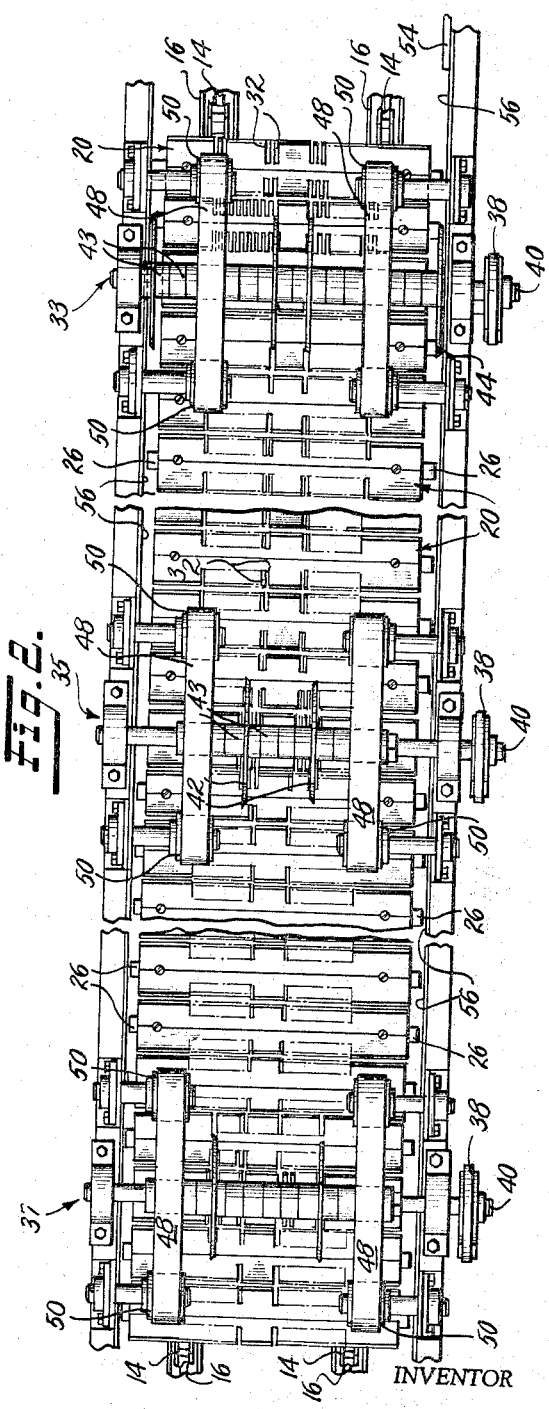
INVENTOR
ROBERT G. RAUTH
JOHN S. SIEGER
BY Bacon & Thomas
ATTORNEYS Oct. 31, 1967  R. G. RAUTH  3,349,822
FRESH CORN TRIMMING AND GRADING MACHINE
Filed Nov. 10, 1965  2 Sheets-Sheet 2
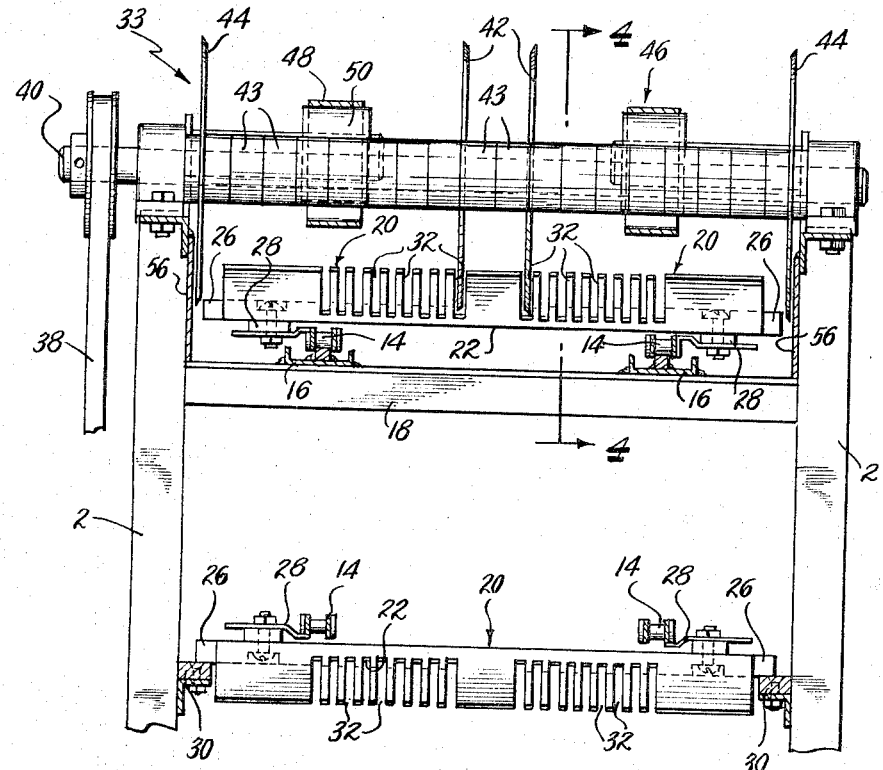
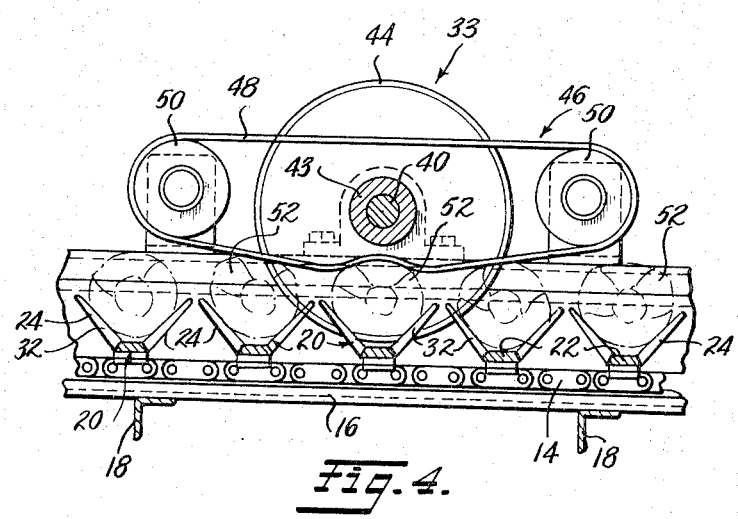
INVENTOR
ROBERT G. RAUTH
BY
Bacon & Thomas
ATTORNEYS

United States Patent Office 3,349,822
Patented Oct. 31, 1967

3,349,822
FRESH CORN TRIMMING AND
GRADING MACHINE
Robert G. Rauth, R.F.D. 1, Box 726,
Del Ray Beach, Fla. 33444
Filed Nov. 10, 1965, Ser. No. 507,197
8 Claims. (Cl. 146—78)

This invention relates to a machine for trimming ears of fresh corn to remove the unsightly or unusable end portions and for producing trimmed ears of graded lengths.

It is desirable to package ears of fresh corn in packages containing a plurality of ears, for direct sale to the consumer. To render such a package attractive it is essential that all the ears in one package be the same length, which also renders the packaging thereof more efficient. It is further desirable that such packages offer ears of corn having no unsightly or unusuable end portions and yet which ears include substantially all of the usable portion of the corn.

Accordingly, the present invention encompasses a machine for achieving these desired results. In brief, the machine comprises a conveyor on which ears of fresh corn, of random lengths, are placed and held oriented to extend transversely of the conveyor. The butt ends of all the ears are placed in alignment and they are passed sequentially through successive trimming stations. The first station is provided with a cutting means to trim the unwanted tip portion of the longest ears, the shorter ears passing therethrough without being cut. Each subsequent station is provided with cutting means arranged to trim the tips of the next shorter ear length and such stations are multiplied until the last station trims the shortest ears that are usable.

It is, therefore, a principal object of this invention to provide a machine wherein ears of fresh corn of random length may be fed thereto and wherein the machine trims each ear to the nearest standard length without waste of usable kernels and which produces trimmed ears of attractive appearance.

Additional and further objects and advantages will become apparent as the description proceeds with reference to the accompanying drawings wherein:

FIG. 1 is a schematic side elevational view of a machine embodying the present invention with portions broken away;

FIG. 2 is a top plan view of the machine of FIG. 1;

FIG. 3 is an enlarged fragmentary transverse sectional view taken along the line 3—3 of FIG. 1; and FIG. 4 is a vertical sectional view taken along the line 4—4 of FIG. 3.

In the processing of fresh corn for the consumer market, it is customary to trim the butt ends of ears of corn as they are received from the field, to sever the connections between the husks and the cobs. After such severing, the husks are removed and the ears are cleaned. However, the butt ends are not always trimmed to the desired or correct length and the cleaned ears usually include unusable tip portions which are not only of no value but in many instances are quite unsightly. The machine of the present invention is intended to receive and process such ears of corn that have been husked in the manner briefly set forth above.

Referring to the drawings, the machine comprises a suitable framework, including frame members 2 upon which an endless conveyor is mounted by means of end rollers 4 and 6. The conveyor is driven by a suitable motor 8, through a sprocket chain 10 and a sprocket wheel 12 on roller 4. The conveyor comprises endless chains 14 (see FIGS. 3 and 4), the upper runs of which are quided by suitable tracks 16 on horizontal cross frame members 18. Affixed to the chains 14 are ear-carrying troughs 20. The structure of these troughs is best seen in FIGS. 3 and 4 wherein each is a unitary, generally V-shaped trough, having a bottom wall 22 and upwardly diverging side walls 24. The bottom wall 22 projects beyond the ends of the side walls 24, as shown at 26, for a purpose to be described. Suitable brackets or hanger means 28 serve to mount each of the troughs 20 on the conveyor chains 14. The lower or return run of the conveyor extends below the frame members 18 and along a return path defined by rails 30 fixed to frame members 2. The projecting ends 26 of the bottom walls of the troughs 20 slidably engage and are supported by the rails 30 whereby to support the weight of the return run of the conveyor. Since the conveyor is of considerable length and since each trough 20 is preferably cast from aluminum or the like, the total weight of the return run is considerable and it has been found that the supporting and guiding rails 30 are highly advantageous.

Each of the troughs 20 is further provided with groups of slots 32 through the side walls 24 and which slots extend substantially the full height of the side walls, the slots in opposite side walls being in alignment of the direction of movement of the conveyor and corresponding slots of each group being the same distance from the corresponding adjacent ends of the trough. For example, the endmost slots of each group may be 3½ inches from the ends of the troughs, whereas the innermost slots may be seven or eight inches from those ends. Preferably, the slots of each group are spaced apart about ½ inch.

As shown in FIG. 1, a plurality of trimming stations are spaced along the length of the conveyor and designated generally 33, 35 and 37. While only three such stations are shown in the drawings, it is to be understood that a greater number is contemplated. Each station comprises a driving motor 36 fixed on a frame member 2, which drives through a belt 38 to a cross shaft 40 on which corn cutting devices 42 are mounted and held in axial position by spacers 43. The corn cutting devices are preferably in the form of rotary discs, which may have either serrated edges or merely knife edges, but each of which is effective to sever or cut through an ear of corn passed thereunder.

As best shown in FIGS. 3 and 4, the cutting means 42 extends downwardly to present their lowermost edges at a level at substantially at or near the bottom of the side walls 24 of the troughs 20. As shown, each of the shafts 40 carries two such cutting discs positioned as will be described later. The first station, station 33, is preferably also provided with rotary cutting means on its shaft 40 at the edges of the machine, such as shown at 44, and which constitute butt trimming cutters. As shown, they are positioned closely adjacent the sides of the conveyor. The frame of the machine is provided with gauging plates or abutments 54 and 56 (FIG. 2) on each side thereof and adjacent the entrance end of the machine and preferably a short distance ahead of the station 33. As shown in FIGS. 1 and 2, the right hand end of the machine constitutes the entrance end thereof, the upper run of the conveyor being driven to move toward the left. As shown in FIG. 3, the cutters 42 are positioned on their shaft 40 so as to pass through the innermost slots 32 of each group of slots in the troughs 20. At the station 35 the cutters 42 are positioned to pass through the next outermost slots of each group whereby their distance from the sides of the conveyor is reduced. The cutters 42 at each succeeding station are positioned nearer the edges of the conveyor so that the cutters at the last station are at such distance from the conveyor edges that they will trim the tips of the shortest ears of corn being processed.

At each station the machine is provided with hold-down means, designated generally at 46 in FIGS. 3 and 4. Each hold-down device comprises a relatively heavyweight endless belt 48 trained over pulleys 50. As shown, there is one pulley 50 on each side of the cutter shaft 40. Preferably, at least one pulley 50 of each pair is driven, by means not shown, so that the lower run thereof moves in the direction of movement of the conveyor and at substantially the same speed. As shown in FIG. 4, the belt 48 is quite loose so that the lower run thereof will partially drape itself over ears of corn 52 carried in the conveyor troughs and will frictionally engage those ears to hold them firmly in their respective troughs 20 while those ears are engaged and cut by the cutters 42.

If desired, additional idler rollers, pivoted to the shafts of pulleys 50 may be arranged to be gravitationally held on the lower run of belt 48 to further assist in pressing the belt against the ears of corn.

In operation, a supply of husked and cleaned ears of fresh corn are delivered to the entry end of the machine shown and may be manually placed in successive troughs 20. An operator may be stationed on each side of the machine so that two ears of corn may be placed in each trough with their butts pointed outwardly. As each ear of corn is placed in the machine, the operator will determine whether or not the butt end needs further trimming. If no further trimming is needed, the ear is placed in a trough with its butt end against the gauge plate 54. This will so position the ear that it will not be cut by the butt trimmer 44 at the first station. However, if additional trimming of the butt end is necessary, the ear is placed in a trough so that its butt end engages the plate 56 whereupon it will be further trimmed by the cutter 44 as it passes through the first station. The trimming stations described are spaced along the conveyor at such distances that operators may stand between the stations to perform the operations described below. As stated, the ears of corn are placed on the conveyor without regard to their length. Those of maximum length will have their tip ends trimmed at the first station by a cutter 42 and shorter ears will pass therethrough without being trimmed. An operator between the first and second station can observe the corn passing his or her position and those that have been sufficiently trimmed at the first station are removed from the conveyor so that they will not be further trimmed at subsequent stations. The next longest ears remaining on the conveyor will be trimmed by the cutter at the second station but to a shorter length and an operator downstream from the second station can then remove all those ears of the next shorter length, which have been properly trimmed, and so on until even the shortest ears have been properly trimmed at the last station. Thus, all the ears trimmed by the machine contain the maximum amount of usable corn and are trimmed into lengths that can be grouped to provide ears of equal lengths for packaging together.

While a single specific embodiment of the invention has ben shown herein, it is to be understood that the same is merely illustrative of the principles involved and that other forms may be resorted to within the scope of the appended claims.

I claim:

1. A fresh corn trimming and grading machine comprising: an elongated conveyor; corn holding means on said conveyor for holding ears of corn of random lengths transversely of said conveyor; gauge means for positioning said ears on said conveyors with their butt ends in alignment adjacent one edge of said conveyor; corn cutting means adjacent said conveyor at successive stations spaced therealong, the cutting means at successive stations being arranged to cut said ears at positions progressively closer to said edge whereby the tips of short ears may pass through some of said stations without being cut and all ears cut at any one station are cut to the same length.

2. A machine as defined in claim 1 including a further cutting means adjacent said one edge, at the first of said stations, for trimming the butt ends of selected ears.

3. A machine as defined in claim 1 wherein each of said corn holding means comprises an upwardly open, generally V-shaped trough having a plurality of spaced slots therein extending substantially to the bottom thereof and extending in the direction of movement of said conveyor; said cutting means at said stations being arranged to pass through said slots as said conveyor moves therepast.

4. A machine as defined in claim 1 wherein each of said corn holding means comprises an upwardly open trough; and hold-down means at each of said stations for holding said ears in said troughs while passing said cutters; each of said cutters being a rotary disc member rotatable about an axis extending transversely across and above said conveyor.

5. A machine as defined in claim 4 wherein said holddown means comprises a belt mounted for movement over and in the direction of movement of said conveyor whereby to engage and hold said ears in said troughs.

6. A machine as defined in claim 1 wherein said conveyor is an endless and articulated conveyor having an upper run passing through said stations and a lower run movable along a return path; said corn holding means each comprising a transversely extending and upwardly open trough having side walls and a bottom wall; the ends of said bottom wall extending beyond the ends of said side walls; and rail means extending along said return path, said rail means being arranged to supportingly engage and guide said extending ends of said bottom walls.

7. A machine as defined in claim 1 wherein each of said corn holding means is a transversely extending and upwardly open trough having upwardly diverging side walls; groups of aligned slots in said side walls, there being a group of said slots adjacent each end of each trough, corresponding slots of each group being spaced the same distance from their respective ends of said trough; there being a pair of said corn cutting means at each station aligned with corresponding slots of said group whereby said machine trims a double row of ears with all ears cut at any one station being cut to the same length.

8. A machine as defined in claim 1 wherein the distance between adjacent stations is sufficiently great for an operator adjacent said conveyor, between said stations, to remove from said conveyor all ears having their tips sufficiently trimmed at one of said stations and before said trimmed ears are carried to the next station.

References Cited
UNITED STATES PATENTS

| | | | |
|---|---|---|---|
| 2,158,977 | 5/1939 | Douthitt | 146—84 |
| 2,310,358 | 2/1943 | Emmons | 146—81 |
| 2,763,305 | 9/1956 | Scheckler | 146—81 |

WILLIAM W. DYER, Jr., *Primary Examiner.*

JAMES J. MEISTER, *Examiner.*